(12) United States Patent
Annicchiarico

(10) Patent No.: US 6,312,749 B1
(45) Date of Patent: Nov. 6, 2001

(54) METHOD AND APPARATUS FOR PRODUCING A CORRUGATED PASTA SHEET, FACILITATING ADHERENCE OF SAUCE TO SURFACE

(75) Inventor: Franco Annicchiarico, Pianoro (IT)

(73) Assignee: Paste Tipiche Regionali S.r.l. (IT)

( * ) Notice: Subject to any disclaimer, the term of this patent is extended or adjusted under 35 U.S.C. 154(b) by 0 days.

(21) Appl. No.: 09/626,728

(22) Filed: Jul. 27, 2000

(30) Foreign Application Priority Data

Jul. 30, 1999 (IT) .............................. BO99A0437

(51) Int. Cl.⁷ .............................. A21C 11/00; A23P 1/00
(52) U.S. Cl. .......................... 426/502; 425/377; 425/465; 426/516; 426/557
(58) Field of Search .................................. 426/496, 502, 426/516, 557; 425/377, 465

(56) References Cited

U.S. PATENT DOCUMENTS

| 3,215,094 | 11/1965 | Oldershaw et al. | 426/512 |
| 3,909,181 | 9/1975 | Wuhrmann et al. | 425/461 |
| 4,420,298 | 12/1983 | Mandrick | 425/463 |
| 5,391,073 | * 2/1995 | Herod et al. | 425/377 |
| 5,840,359 | * 11/1998 | Lechthaler et al. | 426/502 |

FOREIGN PATENT DOCUMENTS

| 531167 | 8/1983 | (AU) . |
| 4014353 | 11/1991 | (DE) . |
| 0 683 981 | 11/1995 | (EP) . |
| 1003775 | 3/1952 | (FR) . |
| 164276 | 10/1920 | (GB) . |

OTHER PUBLICATIONS

European Search Report, dated Oct. 26, 2000.

* cited by examiner

Primary Examiner—George C. Yeung
(74) Attorney, Agent, or Firm—Fay, Sharpe, Fagan, Minnich & McKee, LLP

(57) ABSTRACT

The present invention concerns a method for producing a corrugated pasta sheet, facilitating the adherence of the sauce to the surface, in which the pasta sheet is obtained by forcibly extruding the dough through a slot in a die plate, comprising the stages during which at least one surface of the sheet is crimped repeatedly using at least one raised arm-type flexible, elasticized blade whose free end comes into contact with the sheet. The blade is inflected reciprocally by the dragging action exerted on it by the sheet as it passes through the slot and by the returning action produced by its elastic properties. An apparatus putting into operation the method described above also forms part of the invention.

23 Claims, 4 Drawing Sheets

METHOD AND APPARATUS FOR PRODUCING A CORRUGATED PASTA SHEET, FACILITATING ADHERENCE OF SAUCE TO SURFACE

BACKGROUND OF THE INVENTION

The present invention applies to the automatic pasta-making machinery sector and relates, in particular, to a method for producing a corrugated pasta sheet which facilitates the adherence of the sauce to the surface, and an apparatus which puts this method into operation.

A fundamental element characterizing the construction of automatic pasta-makers, which demands constant, generalized research on the part of all constructors in the sector, is the machine's capacity to produce pasta with a rough surface texture, thereby helping the sauce to adhere to the surface once the pasta has been prepared and improving the quality of the dish created.

Although several types of pasta with grooved surface are already well known, endless attempts to construct a machine which is capable of producing corrugated pasta in the form of a sheet produced by extruding the dough forcibly through a slot in a die plate have revealed the difficulties involved; these prevent the desired results from being obtained in a practical way at an industrial level.

Several prototype machines constructed in the past to obtain this product were in fact equipped with extremely complex mechanisms which were not only costly, but were also unreliable and prevented production from progressing at a regular rate; the result, on the one hand, was that the machines were unable to supply a product of consistent, lasting quality, and on the other, that they required frequent servicing and setting up procedures.

Some pasta producers have now chosen to overcome the problem in a different way, attempting to obtain a corrugated surface by means of a heating effect produced during the production process.

The process basically consists of the pasta being fed through the hole in the die plate at a high temperature and then blasted by a strong current of cold air, accelerated by purposely-designed fans, before being rolled by fitted rollers.

By cooling the sheet, the upper layers of the pasta tend to cool down much more rapidly than the internal layers which remain at a higher temperature for a longer period of time. This operating stage produces a corrugated surface which remains intact, even when the pasta is rolled and cut as required, and passes on to the next stages in the production cycle.

The basic problem with this method, however, is the fact that the rough texture produced disappears totally once the pasta is immersed in hot water for cooking.

Immersion in hot water in fact causes all the layers of the pasta, both internal and external, to homogenize.

From the facts described above, it is therefore apparent that this type of operating method produces a corrugated effect of merely aesthetic quality which, disappearing as soon as the pasta is cooked, does not in any way facilitate the coating of the sauce which is generally added once the pasta has been cooked and removed from the water.

The aim of the present invention is to provide a method whereby corrugated pasta is produced which is genuinely capable of retaining the sauce; a method which is simple and reliable; which is capable of ensuring that consistent quality standards are maintained over a period of time; and which can be put into operation with the use of machinery of relatively simple construction, cheap to run, durable and requiring minimal servicing.

SUMMARY OF THE INVENTION

These aims and others which are described in more detail in the description below are achieved in accordance with the present invention by a method for producing a corrugated pasta sheet, facilitating the adherence of the sauce to the surface, in which the pasta sheet is obtained by forcibly extruding the dough through a slot in a die plate. The method is characterized by the fact that it comprises the stages during which at least one surface of the sheet is crimped repeatedly, using at least one raised arm-type flexible, elasticized blade whose free end comes into contact with the sheet. The blade is bent out of its non-deformed configuration by the reciprocal dragging action exerted on it by the sheet as it passes through the slot and the returning action produced by its elastic properties. The blade acts as a vibrating element which, together with the die plate, enables material on the surface of the pasta sheet to be transferred from one point to another; such transfer producing a pattern on the surface of the pasta sheet while it is being extruded.

The use of a single blade, which works on only one surface of the pasta, allows pasta to be produced which is suitable for fillings, such as tortellini, ravioli and similar forms, or types of pasta which are wrapped over to enclose a filling, such as cannoli.

The use, on the other hand, of two blades mounted facing each other, allows pasta shapes such as tagliatelle, farfalle and similar to be produced.

Given the relative ease with which the bending characteristics producing the vibrating movement of the blade can be varied, by selecting appropriate construction materials and measurements for the blade, for example, or by mounting more than one blade, each with different characteristics, the method defined by the invention can be used to produce a vast range of rough surface textures, with a variety of geometrical shapes and profiles of different sizes. This therefore allows pasta to be produced which has different, novel characteristics, in terms of both the use to which it is put for the preparation of specific dishes and its external appearance.

In accordance with the present invention, an apparatus is also supplied, according to claim 12, with which the method is put into operation, adopting an embodiment which, apart from the vibrating blade, is of a static type and, being free of any moving parts, is capable of ensuring reliable, safe and repetitive performance over a long period of time.

BRIEF DESCRIPTION OF THE DRAWINGS

Further characteristics and advantages of the present invention are more clearly illustrated in the detailed description which follows, with reference to the accompanying drawings, which illustrate a preferred embodiment without limiting the scope of application, and in which.

DESCRIPTION OF THE PREFERRED EMBODIMENTS

With reference to the drawings listed above, the numeral 1 indicates an apparatus, operated in accordance with the method designed to produce a corrugated pasta sheet 2 which facilitates the adherence of the sauce and which is the subject matter of the present invention.

Figure 1:
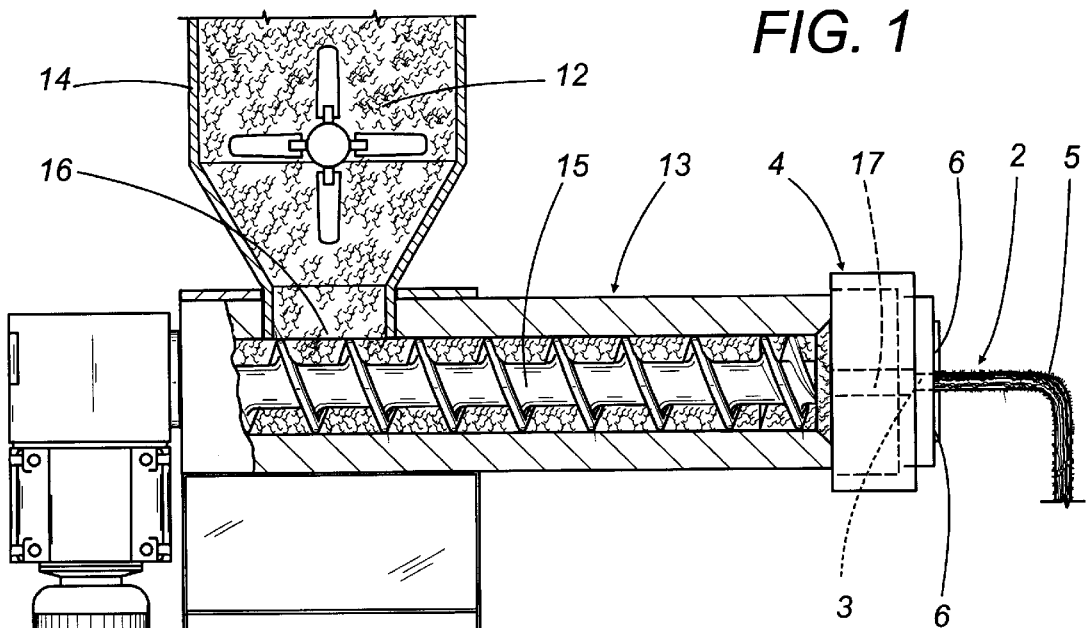
FIG. 1 is an overall view of the apparatus according to the present invention.

The apparatus 1, illustrated in FIG. 1, basically consists of a press used to extrude the dough 12 which in turn comprises, merely by way of example without restriction, a tubular extrusion chamber 13 mounted next to and connected to a tub 14 where the dough 12 is re-mixed and a die plate 4 with a gauged slot 3. A screw conveyor 15, operated by the relevant drive units 18, fitted inside the extrusion chamber 13, picks up the dough 12 from the open, lower base 16 of the tub 14 and transfers it without interruption along a duct 17 leading to the die plate 4, towards the gauged slot 3, forcing the dough 12 out of the slot 3 and thereby causing it to take on the shape of the contour of the hole.

Outside the die plate 4, the apparatus 1 comprises either one or two flexible, elasticized blades 6, each mounted transversally to the feed path 8 of the sheet 2 as it passes through the slot 3; it is secured to the die plate 4; it is raised and moved by the die plate 4 towards the sheet 2 in such a manner that its free end 7 comes into contact with the sheet 2.

Figure 8A:
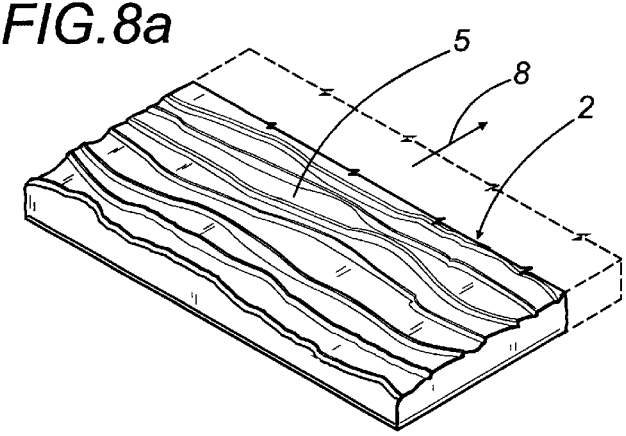
FIGS. 8a to 8g illustrate corresponding types of pasta, fresh or dried, which can be made with the apparatus illustrated in the preceding figures.

As the sheet 2 is fed through the slot 3, the blade 6 is inflected reciprocally by the dragging action exerted on it by the sheet 2 as it passes through the slot 3 and the returning action through which it regains its non-deformed configuration, by virtue of its elastic properties. The reciprocating bending and elastic returning movement of the blade 6, together with the fact that the blade 6 is in continuous contact with the sheet 2, brings about a transfer of material in the dough, affecting the outer layers of the surface 5 of the sheet 2 in a manner which produces a characteristic crimped texture on the surface of the sheet 2 (see also FIG. 8a).

It is pointed out that the corrugated texture on the sheet 2 produced by crimping the surface 5 is brought about by actually transferring the dough 12 from one point to another over its surface 5 and therefore remains unaltered even after the pasta has been immersed in hot water for cooking.

Figure 3:
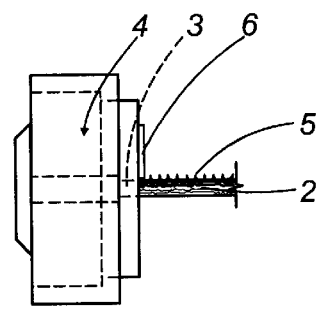
FIGS. 3 and 4 are partial views of two distinct, alternative variations of the detail illustrated in FIG. 2.
Figure 4:
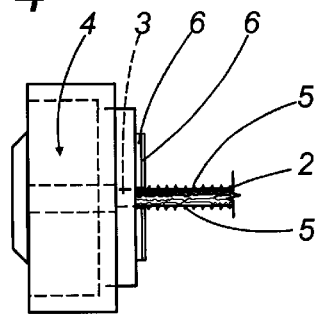
Figure 8B:
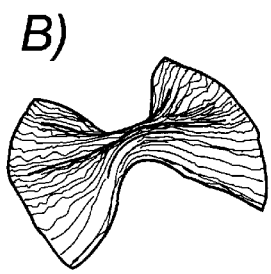
Figure 8C:
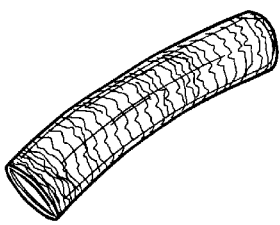
Figure 8D:
Figure 8E:
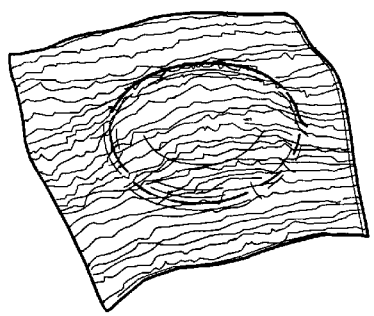
Figure 8F:
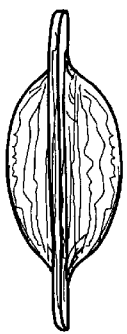
Figure 8G:
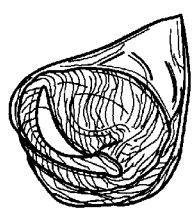

It is evident from FIG. 3 that the embodiment of the apparatus 1 which envisages the use of only one blade 6 is particularly suitable for the production of sheets 2 of pasta which are corrugated on only one side, applicable, for example, for the preparation of pasta with fillings of various types such as "orecchiette" (see FIG. 8d); "ravioli" (see FIGS. 8e and 8f); "tortellini or tortelloni" (see FIG. 8g); and also for pasta shapes which require the sheet 2 to be rolled, and possibly enclose a filling (see FIG. 8c).

Figure 2:
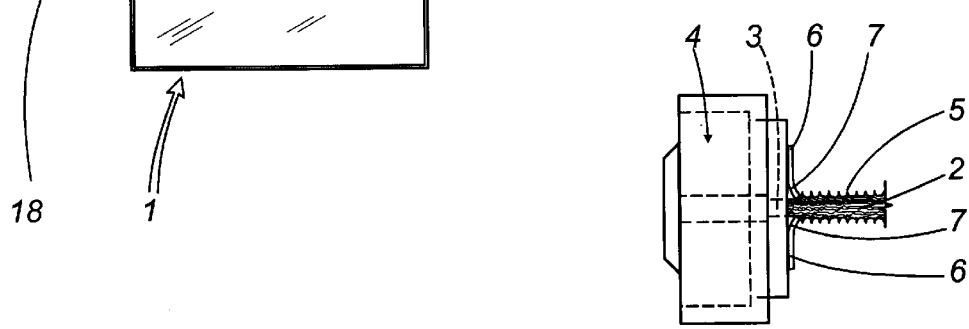
FIG. 2 is a partial view of a detail from FIG. 1.

If, on the other hand, the apparatus 1 is equipped with a pair of blades 6, (see FIG. 2), mounted on either side of the slot 3 in the die plate 4, both the upper and lower outer surfaces 5 of the pasta sheet 2 can be corrugated and other types of pasta obtained, such as those illustrated in FIG. 8b and known as "farfalle" (bow ties).

As far as the design of the corrugated profile is concerned, tests have been carried out on blades 6 of a thickness of approximately 0.3 mm constructed in extra-work hardened stainless steel, and have produced very satisfactory results.

The example illustrated above should be treated as merely an example of a possible solution, as it is clear from what has been described above, that, by altering the geometric and physical characteristics capable of influencing the inflection of the blade 6, the design and depth of the corrugated finish on the pasta can be varied with relative ease in order to obtain a vast range of products which also differ in appearance.

The corrugation design can in fact be modified with the use of single-layer blades 6 of differing lengths and thicknesses, selected appropriately; otherwise, composite blades 6 can be used, made up of more than one layer, one on top of the other, and combined, adopting the lengths, thicknesses and/or construction materials most appropriate.

The invention described not only fully achieves the basic object whereby a corrugated pasta sheet 2 is produced whose characteristics endure, remaining intact during the cooking process without any alteration to its geometric form, but also allows macaroni to be extruded whose external surface 5, or even internal surface 5, is corrugated around its circumference.

Figure 5:
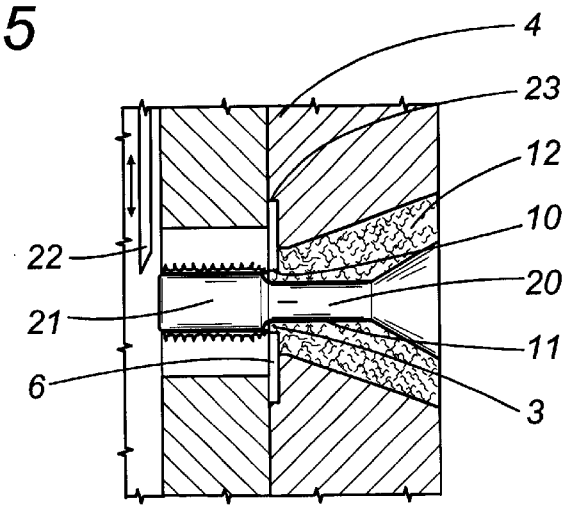
FIG. 5 is a drawing of an alternative embodiment of the apparatus to that illustrated in FIG. 1.
Figure 5A:
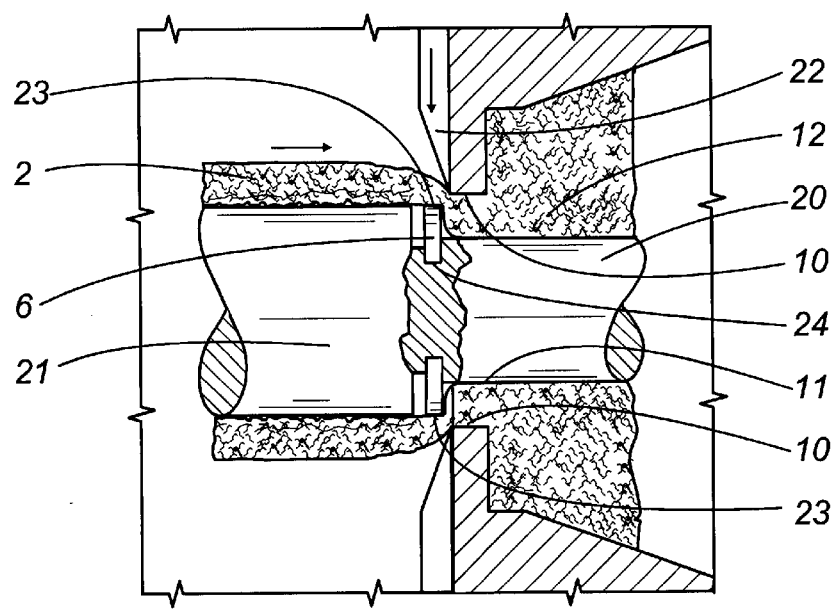
FIG. 5a is an enlarged scale drawing of a variant of FIG. 5.

To this end, the apparatus 1 can be constructed in such a way that the pasta is extruded through a ring-shaped slot 3 (see FIGS. 5 and 5a). The parameter of the ring-shaped slot 3 is defined by the combination of an outer edge 10 of the die plate 4 and the surface 20 facing it of a insert pin 21 fitted across the die plate 4; in this case, the surface 20 marks the internal edge 11 of the slot 3. This apparatus 1, which has already been fully described, can be used to produce a sheet 2 which is substantially tubular in shape and is later cut into pieces of an appropriate length by cutting equipment 22, also of a conventional type.

If the slot 3 is fitted with a ring-shaped blade 6, secured to the die plate 4 along its outer edge 23 and constructed with a number of adjacent circular segments 9, each capable of bending independently of the others, which are fitted along the circumference of the slot 3 and positioned so that they converge on the tubular sheet 2, the external surface 5 of the tubular sheet 2 can be corrugated by applying a series of circumferential embossed markings which follow on, one after the other, in the direction in which the sheet is being fed 8, in the present case, representing the line of axis of the tubular sheet 2.

Figure 6:
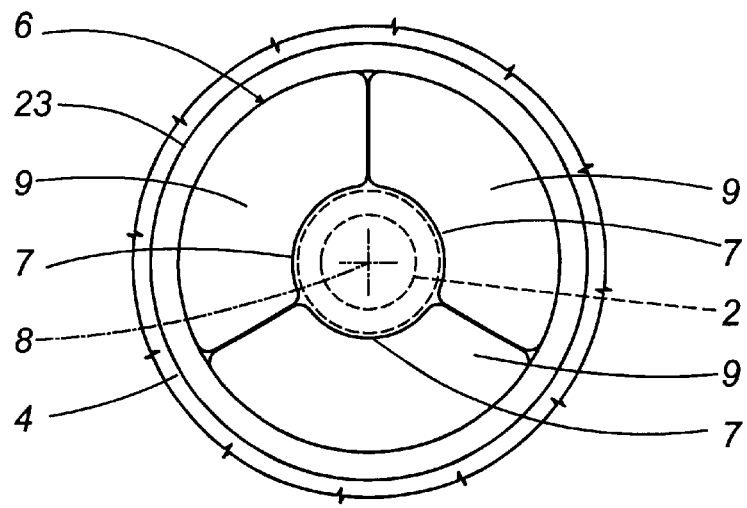
FIGS. 6 and 7 are front views of a scale enlargement of a detail taken from FIG. 5, illustrated as two alternative embodiments.
Figure 7:
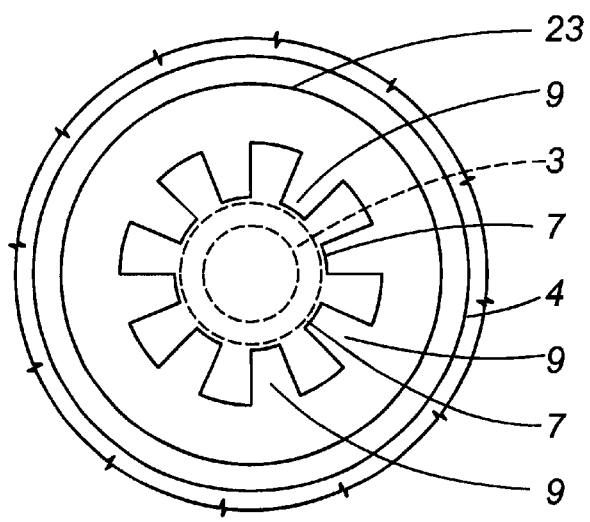

Again in this case, by varying the shape and number of segments 9, as illustrated by way of example in FIGS. 6 and 7, considerable scope is given to the corrugation design applied to the pasta as it is extruded.

Specific reference is made in FIGS. 6 and 7 to an embodiment of the apparatus 1 which is capable of corrugating the outer surface 5 of the tubular sheet 2; there is no reason however why the inner surface cannot be corrugated in the same way. In fact, it is immediately evident from FIG. 5a that this result can be obtained if the blade 6 is structured in such a way that it is rigidly secured to the insert pin 21 along its inner edge 24 and its outer edge 23 is turned to face the die plate 4, left free to enclose the internal edge 11 of the extrusion slot 3, together with the die plate 4.

The invention described above can be subject to numerous modifications and variations, without departing from the scope of the inventive concept. Moreover, all the details may be substituted by technically equivalent elements.

What is claimed is:

1. A method for producing a corrugated pasta sheet, facilitating the adherence of a sauce to at least one surface of the pasta sheet, in which the pasta sheet is obtained by forcibly extruding a dough through a slot in a die plate along a feed path, comprising a stage of crimping said at least one surface of the sheet repeatedly by at least one raised arm-type flexible, elasticized blade whose free end comes into contact with the sheet, the blade being inflected reciprocally by the dragging action exerted on the blade by the sheet as the sheet passes through the slot and by the returning action produced by its elastic properties.

2. The method according to claim 1, wherein the crimping stage is obtained with the use of at least one of the blades mounted transversally to the feed path of the sheet.

3. The method according to claim 1, wherein both the upper and the lower outer surfaces of the pasta sheet are crimped with the use of a pair of the corresponding blades, mounted on either side of the slot in the die plate.

4. The method according to claim 1, wherein the flexible blade or each of the flexible blades is a single layer blade.

5. The method according to claim 4, wherein the blade or each of the blades is a composite blade, having more than one layer, one on top of the other.

6. The method according to claim 1, wherein the blade is constructed in extra-work hardened stainless steel.

7. The method according to claim 5, wherein the blade has a thickness of approximately 0.3 mm.

8. The method according to claim 1, in which the pasta is extruded forcibly through a ring-shaped slot, wherein the sheet is crimped by at least one blade constructed with at least one circular segment converging on the sheet.

9. The method according to claim 8, wherein the blade is constructed with a number of the segments, each capable of bending independently of the others, which are fitted along the slot in the die plate.

10. The method according to claim 8, wherein the segment or each of the segments is secured firmly to the outer edge of the slot in the die plate.

11. The method according to claim 8, wherein the segment is secured firmly to the inner edge of the slot in the die plate.

12. An apparatus to produce a corrugated pasta sheet, facilitating the adherence of a sauce to at least one surface of the pasta sheet, in which the pasta sheet is obtained by forcibly extruding a dough through a slot in a die plate along a feed path, comprising at least one raised arm-type flexible, elasticized blade mounted on either side of the slot in the die plate whose free end comes into contact with the sheet, the blade being inflected reciprocally by the dragging action exerted on the blade by the sheet as the sheet passes through the slot and by the returning action produced by its elastic properties, thereby repeatedly crimping said at least one surface of the sheet.

13. The apparatus according to claim 12, wherein the blade is mounted transversally to the feed path of the sheet.

14. The apparatus according to claim 12, comprising a pair of the blades, mounted on either side of the slot in the die plate.

15. The apparatus according to claim 12, wherein the flexible blade or each of the flexible blades is a single layer blade.

16. The apparatus according to claim 12, wherein the blade or each of the blades is a composite blade, having more than one layer, one on top of the other.

17. The apparatus according to claim 12, wherein the blade is constructed in extra-work hardened stainless steel.

18. The apparatus according to claim 12, wherein the blade has a thickness of approximately 0.3 mm.

19. The apparatus according to claim 12, wherein the blade or each of the blades is mounted directly on the die plate.

20. The apparatus according to claim 12 in which the pasta is extruded forcibly through a ring-shaped slot, wherein the blade is constructed with a circular segment converging on the sheet.

21. The apparatus according to claim 20, wherein the blade is constructed with a number of the segments, each independent of the others, which are fitted, at least partially, along the slot in the die plate.

22. The apparatus according to claim 20, wherein the segment is secured to the outer edge of the slot in the die plate.

23. The apparatus according to claim 20, wherein the segment is secured to the inner edge of the slot in the die plate.

* * * * *